United States Patent
Matsumoto

[11] 3,785,812
[45] Jan. 15, 1974

[54] METHOD OF EXPOSURE IN MULTI-COLOR ELECTROPHOTOGRAPHY

[75] Inventor: Seiji Matsumoto, Asaka, Japan

[73] Assignee: Fuji Photo Film Co., Ltd., Kanagawa, Japan

[22] Filed: Nov. 27, 1970

[21] Appl. No.: 92,975

[30] Foreign Application Priority Data
Nov. 27, 1969 Japan..........................44/95223

[52] U.S. Cl............................ 96/1.2, 355/4, 350/188
[51] Int. Cl............................................. G03g 13/04
[58] Field of Search....................... 96/23, 45.1, 1.2, 96/1, 1.6; 350/188

[56] References Cited
UNITED STATES PATENTS
| | | | |
|---|---|---|---|
| 3,293,033 | 12/1966 | Maddock et al. | 96/23 |
| 3,585,029 | 6/1971 | Neale | 96/23 |
| 3,588,215 | 6/1971 | Singh | 96/23 |

OTHER PUBLICATIONS

Dessaver et al. Zerography, pp. 54–55, 1965.

*Primary Examiner*—George F. Lesmes
*Assistant Examiner*—M. B. Wittenberg
*Attorney*—Addams & Ferguson

[57] ABSTRACT

An exposure method for use in multi-color electrophotography where (1) the degree of light diffusion is decreased when exposing with the blue component in a trichromatic separation, (2) the degree of light diffusion is increased when exposing with the other color components, and (3) a tungsten light source is used as the medium for projection.

1 Claim, 2 Drawing Figures

FIG. 1
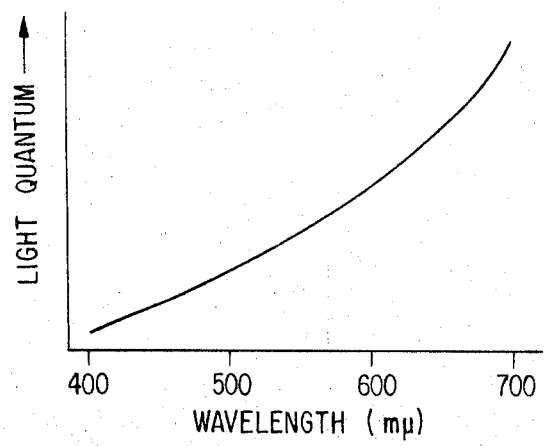
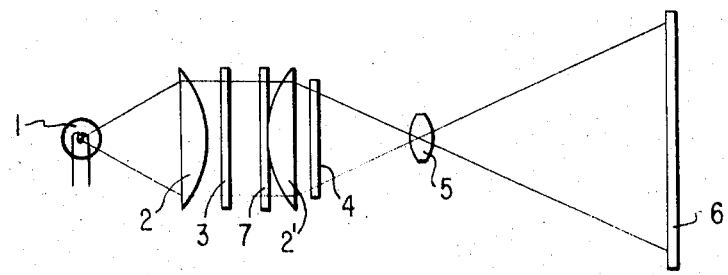
FIG. 2
INVENTOR
SEIJI MATSUMOTO
BY Gerald J. Ferguson Jr.
ATTORNEY

METHOD OF EXPOSURE IN MULTI-COLOR ELECTROPHOTOGRAPHY

BRIEF EXPLANATION OF THE DRAWING

FIG. 1 is a diagram showing the distribution of light quantum against wavelength as contained in the light radiated from a tungsten tube.

FIG. 2 is a schematic diagram of one example of optical system for working the present invention.

DETAILED DESCRIPTION OF THE INVENTION

This invention relates to an efficient method of exposure for use in multi-color electrophotography.

In the electrophotography, when the photoconductive sensitive layer is uniformly charged and subsequently exposed to light being projected through the image, there is generated, within the sensitive layer interior, one or less electric charge carrier per one light quantum of the light being used for exposure, with the consequence that the electric charge on the surface of the sensitive layer is discharged. Where there is generated one electric charge carrier per one light quantum absorbed in the sensitive layer consequently to effect discharge of the electric charge, the quantum efficiency is said to be in the magnitude of one. The light source which is used for such exposure in the multi-color electrophotography is a tungsten bulb which offers the most convenient use. Generally, however, the light from the tungsten bulb has a low color temperature and has a very small component of short-wavelength (blue in the visible light zone). When the exposure is made by using such tungsten bulb, the amount of light on the short wavelength side is very small even if the quantum efficiency is one over the entire photosensitive region and, as a consequence, the amount of exposure becomes extremely small where the exposure is required to be made only in blue color such as by using a blue filter. If the time of exposure is increased for the purpose of obtaining sufficient amount of exposure, there will inevitably result a heavy difference from the exposure time suitable for the light of other colors such as, for example, green and red, making it necessary to set the exposure time depending on each color of light. From the standpoint of operational efficiency, it is not desirable to lengthen the time of exposure by using a filter of dark shade of the light of other colors so as to balance the time of exposure with that of the light of blue color. It is difficult, as a result, to obtain a photoconductive sensitive layer with sufficiently high sensitivity for use in electrophotography. Because of generally low sensitivity, there is a drawback that the time of treatment will be lengthened all the more.

The optical systems for exposure consist of the condensing system and the duffusing system. The former system, although efficient, is defective in that granular distribution and flaws become conspicuous. The latter system, though inferior in efficiency, is advantageous in that neither granular distribution nor flaws become conspicuous.

This invention concerns a multi-color electrophotographic process which permits a shortened exposure time and produces an image which is free from conspicuousness of granular distribution or of flaws through effective utilization of the aforementioned spectroscopic characteristics of the tungsten bulb, the intrinsic nature of the optical system for exposure, and the defective sensitivity of human eyes to the change of density of yellow color. In case where toners of three or four colors, namely, cyan, magenta, yellow and/or another auxiliary color, are used for obtaining a color electrophotograph, the color of yellow cannot be sensed very clearly by human eyes and, as a consequence, inferior granular distribution or a considerable extent of flaws can hardly be sensed in this color. This shortcoming is put to advantage: The sensitivity in the spectroscopic characteristic of the tungsten bulb is compensated by using a condensing optical system for exposure to blue light for ontaining a yellow image, while the overall efficiency is improved by using a diffusing optical system for exposure to lights of green, red and other color for obtaining magenta and cyan images. Consequently, there can be obtained a multicolor image free from conspicuousness of granular distribution of flaws.

The present invention is described further below by referring to the drawing. FIG. 1 shows the distribution of light quantum at varying wavelength of a tungsten bulb having a color temperature of 3,000°K. In the graph, the abscissa represents wavelength and the ordinate the number of light quantum respectively. As is clear from this graph, the light quantum in the region of wavelengths from 400 to 500 m$\mu$ used for the exposure to blue light is markedly small as compared with that in the region of wavelengths from 500 to 700 m$\mu$.

FIG. 2 shows one example of the optical system for exposure. In the diagram, 1 denotes a tungsten bulb (which may be a bulb containing therein a halogen element), 2 and 2' each a condenser, 3 a filter for color separation, 4 a color original, 5 a projecting lens, 6 a photoconductive sensitive layer, and 7 a diffusing plate. The optical system serves as that of diffusing nature when this diffusing plate 7 is inserted in position and as that of condensing nature in the absence of this plate. The position for inserting this diffusing plate 7 may be chosen at any desired point between the tungsten bulb 1 and the color original 4.

For obtaining a yellow image with inconspicuous granular distribution or flaws by such optical system as this, the exposure is carried out by either omitting the insertion of the diffusing plate 7 or inserting a diffusing plate 7 having a small degree of light diffusing while using a blue filter at the same time. Since light is allowed to reach the sensitive layer 6 with high efficiency, even the light of blue component having a smaller amount of light among the light components of the tungsten bulb 1 enables the sensitive layer to obtain sufficient exposure and there can be produced a yellow image component free from conspicuousness of granular distribution or flaws.

In obtaining a magenta and a cyan image, the optical system is utilized as the diffusing optical system by inserting a diffusing plate 7 having high degree of light diffusion under using a green or red filter at the same time. By so doing, there can be obtained a magenta or cyan image component capable of conferring sufficient stimulation to human eyes. Thus, this invention enables the exposure to be carried out efficiently to produce the desired multi-color image without sacrificing th image quality. In this optical system, the diffusing plate 7 and the each color-separation filter 3 may be used in the form of one combined unit. It is also permissible to interlock the change of color-separation filter 3 with the inserting or removing of the diffusing plate 7.

What we claim is:

1. In a method of reproducing a colored original comprising the steps of successively exposing an electrophotographic member to said colored original through a plurality of filters of different primary colors, at least one of said filters being substantially blue to thereby form on said electrophotographic member successive latent images respectively corresponding to the complementary color of its associated filter and successively developing said latent images with toner of said corresponding complementary color, the improvement comprising the steps of illuminating said original with a tungsten light source; and diffusing the light, during the utilization of said blue filter, less than when the other of said filters are utilized so that flaws in said colored original are minimized in the reproductions thereof because of the lessened sensitivity of the eye to the color yellow, which is used to develop the latent image obtained with the blue filter.

* * * * *